United States Patent [19]

Prokofievna et al.

[11] 4,364,976
[45] Dec. 21, 1982

[54] METHOD OF PREPARING MODIFIED WOOD

[76] Inventors: Skripchik L. Prokofievna, ulitsa Koltsova, 4, korpus 3, kv. 59; Shutov G. Moiseevich, ulitsa Lomonosova, 10, kv. 33; Erdman M. Emmanuilovna, ulitsa Vostochnaya, 11, kv. 5; Pukhalsky M. Eduardovich, ulitsa Kakhovskaya 37, kv. 32; Lezhen V. Ivanovich, Leninsky prospekt 14, kv. 15; Shevchenko A. Ignatievich, ulitsa Ya.Mavra, 44, kv. 20, all of Minsk; Vrublevsky E. Vladimirovich, Gomelskaya oblast ulitsa Zavodskaya 3, Svetlogorsk, all of U.S.S.R.

[21] Appl. No.: 285,905

[22] Filed: Jul. 23, 1981

[51] Int. Cl.$^3$ .................... B05D 1/18; B05D 3/02
[52] U.S. Cl. .................... 427/382; 427/297; 427/397; 427/440
[58] Field of Search ............ 427/297, 440, 397, 382

[56] References Cited

U.S. PATENT DOCUMENTS 4,301,217  11/1981  Rohringer et al. ............ 427/440 X

FOREIGN PATENT DOCUMENTS 667657  1/1966  U.S.S.R. .
575218  10/1977  U.S.S.R. ............ 427/440
674904  7/1979  U.S.S.R. .

Primary Examiner—Michael R. Lusignan
Attorney, Agent, or Firm—Ladas & Parry

[57] ABSTRACT

Disclosed is a method of preparing modified wood, comprising the successive steps of impregnating a wood in two stages, using phenolic alcohols at the first stage and fire retardants at the second stage, drying it, and heat treating to obtain the end product, with the heat treatment performed, in one of the embodiments, in a hydrophilic heat transfer fluid.

5 Claims, No Drawings

METHOD OF PREPARING MODIFIED WOOD

FIELD OF THE INVENTION

The present invention relates to the wood-working indistries and, specifically, to a method of preparing modified wood.

Modified wood obtained in accordance with the present invention can be utilized as construction material for the building industry, car building, railway transport, venting pipe stacks, mineral fertilizer storage facilities, livestock breeding facilities, and for other building and construction projects, as well as for soil-contacting structures and articles, and as substitute for ferrous and non-ferrous metals in machine building and mechanical engineering.

BACKGROUND OF THE INVENTION

In recent times, the problem of modifying wood has gained greatly in importance in view of the wood resources having suffered sizable losses in a number of countries and the need being felt for improving the durability of wood products.

It has been known in the prior art to obtain hard-burning wood (cf. e.g., USSR Inventor's Certificate No. 178,087, Cl. B 27 K 3/20) by a one-stage impregnation of a wood with an aqueous solution of phenolic alcohols, containing an addition of diammonium phosphate, and by subsequent curing of the phenolic alcohols incorporated in the impregnated wood by heat treatment.

Because of the poor compatibility of phenolic alcohols and diammonium phosphate, the phenolic alcohols in the solution are caused to polymerize as the fire retardant is added, brining the pH of the solution down to 5 to 6. The life time of such an impregnating system does not exceed 12 hours.

Another method known to the prior art (cf., e.g., USSR Inventor's Certificate No. 674,904, Cl. B 27 K 3/52) for producing hard-burning wood is by a one-stage impregnation of a wood with an aqueous solution of phenolic alcohols, containing diammonium phosphate/ammonium sulphate, urea and ammonia as additives, and by subsequent curing of the phenolic alcohols incorporated in the wood by heat treatment.

By increasing the pH of the impregnating solution to 8 to 8.5, the urea and ammonia additions contribute to better compatibility between the phenolic alcohol and diammonium phosphate/ammonium sulphate components. Yet the life time of the impregnating solution used here for obtaining hard-burning modified wood is a mere 30 days even for phenolic alcohols with a solubility as high as 1:10, while under commercial production conditions the practice is to allow the use of phenolic alcohols with a solubility as low as 1.3, in which case the life time of an impregnating solution incorporating phenolic alcohols and fire retardants would be as short as 6 days. By consequence, the solution would have to be renewed as often, and this would lead to substantial impregnating solution losses.

It is an object of the present invention to provide a method of preparing modified wood, such as would enable a higher-rate modified-wood production process.

Another object of the present invention is to provide a method for preparing modified wood, such as would allow of increasing the life time of the impregnating system.

A further object of the present invention is to provide a method of preparing modified wood, such as would afford a lower-toxicity production process.

SUMMARY OF THE INVENTION

These and other objects are attained by the provision of a method of preparing modified wood, comprising the steps of impregnating a wood, drying it, and heat treating, in which method impregnation is performed, in accordance with the invention, in two stages, at the first stage the wood being impregnated by phenolic alcohols while at the second stage the wood is impregnated by fire retardants.

Carrying out impregnation in two stages avoids the undesirable effects of incompatibility between phenolic alcohols and fire retardants, the latter possessing acidic properties and, as such, causing the phenolic alcohols to coagulate, the impregnating solution to grow considerably in viscosity and lose in water solubility, and the life time of the impregnating solution to shorten.

Providing for two-stage impregnation in the proposed method used to prepare modified wood avoids the problem of compatibility between phenolic alcohols and fire retardants and thus permits the life time of the impregnating system to be increased to that of the original phenolic alcohols employed.

Successive impregnation with aqueous solutions of phenolic alcohols and fire retardants enables the cell walls of the wood to be impregnated with phenolic alcohols, this contributing to enhanced water and moisture resistance, dimensional stability, and high mechanical properties in the modified wood obtained. Subsequent impregnation with fire retardants favours the formation of a complex compound of phenolic alcohols bound with fire retardants, assuring the obtaining of a hard-burning modified wood.

In another embodiment of the invention, the recommended practice is for the second impregnation stage to be combined with drying and heat treatment.

Combining the second impregnation stage with drying and heat treatment is made possible by the action of the fire retardant upon the curing process of the phenolic alcohols, the fire retardant catalyzing the curing process, while it improves the resistance to fire of the modified wood obtained, and thus enabling polycondensation temperatures to be reduced and the polycondensation process to be completed at lower temperatures, which greatly simplified the production process and cuts down the energy costs involved.

It is recommended that phenolic alcohols and fire retardants be used for impregnation in the following proportions, in percent by mass:
phenolic alcohols—25 to 50
fire retardants—20 to 40

It has been established experimentally that using the components in said proportions enables preparation of a modified wood featuring the properties of a hard-burning material.

In a further embodiment of the invention, it is recommended that impregnation, drying and heat treatment be performed in a hydrophilic heat transfer fluid. The use of a hydrophilic heat transfer fluid affords high temperature drying of the impregnated wood and allows of obtaining modified wood products featuring good texture retention and requiring no further cleaning or surface treatment.

One hydrophilic heat transfer agent that can be conveniently employed is an aqueous solution of ammonium salts, having a boiling temperature of at least 100° C., said temperature assuring a final moisture content in the wood obtained equal to 15%.

DETAILED DESCRIPTION OF THE INVENTION

Wood specimens of predetermined dimensions are loaded into an autoclave. The autoclave is evacuated down to 6.5–7.5 k Pa, an aqueous solution of phenolic alcohols is fed in thereafter, and the pressure is built up to 0.8 MPa during a period of 4 hours. On the expiration of this period, the impregnated wood specimens are dried by convection, in one of the embodiments, until the free water present is fully removed, and the bound water is partially so. Then another impregnation stage follows, with an aqueous solution of a fire retardant.

The second impregnation stage may be combined with drying and heat treatment, with the processes of impregnating the wood with salts, drying the impregnated wood, and curing the impregnating system contained therein occurring simultaneously. The impregnating agents used will be phenolic alcohols and fire retardants taken in the following proportions, in percent by mass:

phenolic alcohols—25 to 50
fire retardants—20 to 40

Combined impregnation, drying and heat treatment may be performed in a hydraulic heat transfer fluid which may be an aqueous solution of ammonium salts, having a boiling temperature of at least 100° C. On completion of the treatment, said hydrophilic heat transfer fluid is pumped out, and a drying vacuum set up, considering that on drying in a hydrophilic heat transfer fluid the moisture on the wood surface may be as high as 25 to 30%.

The finished specimens of hard-burning modified wood are unloaded.

The quality of the modified wood so obtained is controlled visually and by determining the percentage of the polymer contained therein, which must be 21 to 31%.

The modified wood obtained by the method described above possesses the properties of a hard-burning material, the mass losses suffered by the modified wood upon combustion amounting to between 4.1 and 7.5%. As an additional advantage, the hard-burning modified wood features enhanced physical properties, as compared to the natural starting material.

The typical examples given below will illustrate the present invention in certain aspects and bring out more clearly the features and advantages specific to it.

EXAMPLE 1

Birch wood specimens were impregnated with phenolic alcohols concentrated to 25% (solids basis), using the vacuum-pressure method. The impregnated wood was then dried by convection to a moisture content of 20%, and impregnated again with an aqueous solution of salts including 10% by mass of diammonium phosphate and 10% by mass of ammonium sulphate.

The impregnating agent introduced into the wood was cured by heat treatment, with the temperature increased incrementally from 60° to 120° C. during a period of 12 hours. The resultant modified wood was found to contain 21% of polymer. The mass losses of the modified wood when tested for resistance to fire were 4.8%. The life time of the impregnating system was 150 days.

EXAMPLE 2

Aspen wood specimens were impregnated with phenolic alcohols concentrated to 35%, using the vacuum-pressure method, the impregnated specimens dried by convection to a moisture content of 20%, and impregnated again with an aqueous solution of salts comprising 15% by mass of diammonium phosphate and 15% by mass of ammonium sulphate. The impregnating system introduced into the wood was cured by heat treatment, with the temperature raised incrementally from 60° to 120° C. during a period of 12 hours. The resultant modified wood contained 25% of polymer. The mass losses of the modified wood when tested for resistance to fire were 4.5%. The life time of the impregnating system was 150 days.

EXAMPLE 3

Birch wood specimens were impregnated with phenolic alcohols concentrated to 35%, using the vacuum-pressure method, the impregnated specimen dried by convection to a moisture content of 20%, and impregnated again with an aqueous solution of salts comprising 20% by mass of diammonium phosphate and 20% by mass of ammonium sulphate. The impregnating system introduced into the wood was cured by heat treatment, with the temperature raised incrementally from 60° to 120° C. during a period of 12 hours. The resultant modified wood contained 27% of polymer. The mass losses of the modified wood when tested for resistance to fire were 4.1%. The life time of the impregnating system was 150 days.

EXAMPLE 4

Birch wood specimens were impregnated with phenolic alcohols concentrated to 50%, using the vacuum-pressure method, the impregnated specimens dried by convection to a moisture content of 20% and impregnated again with an aqueous solution of salts comprising 10% by mass of diammonium phosphate and 10% by mass of ammonium sulphate. The impregnating system introduced into the wood was cured by heat treatment, with the temperature raised incrementally from 60° to 120° C. during a period of 12 hours. The resultant modified wood contained 29% of polymer. The mass losses of the modified wood when tested for resistance to fire were 4.0%. The life time of the impregnating system was 150 days.

EXAMPLE 5

Birch wood specimens were impregnated with phenolic alcohols concentrated to 50%, using the vacuum-pressure method, the impregnated specimens dried by convection to a moisture content of 20% and impregnated again with a 20% aqueous diammonium phosphate solution. The impregnating system introduced into the wood was cured by heat treatment, with the temperature raised incrementally from 60° to 120° C. during a period of 12 hours. The resultant modified wood contained 31% of polymer. The mass losses of the modified wood when tested for resistance to fire were 15%. The life time of the impregnating system was 150 days.

EXAMPLE 6

Alder wood specimens were impregnated with phenolic alcohols concentrated to 50%, using the vacuum-pressure method, the impregnated specimens dried by convection to a moisture content of 20% and impregnated again with a 20% aqueous ammonium sulphate solution. The impregnating system introduced into the wood was cured by heat treatment, with the temperature raised incrementally from 60° to 120° C. during a period of 12 hours. The resultant modified wood contained 28% of polymer. The mass losses of the modified wood when tested for resistance to fire were 20%. The life time of the impregnating system was 150 days.

EXAMPLE 7

Birch wood specimens were loaded into an autoclave which was then evacuated to a residual pressure of 0.0067 MPa during a period of 1 hour. This done, a 35% aqueous solution of phenolic alcohols was fed into the autoclave, and the pressure was built up to 0.8 MPa. On the expiration of 4 hour, the pressure was lowered, the phenolic alcohol solution pumped out, and, immediately after, an aqueous solution of salts containing 10% of diammonium phosphate and 10% of ammonium sulphate and preheated to 103° C. was fed into the same autoclave and kept constantly in circulation by means of a rotary pump. The specimens were treated with said solution for a period of 10 hours, at atmospheric pressure, with the processes of impregnating the wood speciments with salts, drying the impregnated wood, and curing the impregnating system contained therein occurring simultaneously. Then the aqueous salt solution was pumped out, and a drying vacuum was created for 20 minutes. The finished hard-burning modified wood specimens were unloaded. The process time was 16 hours. The modified wood was found to contain 21% of polymer. The mass losses upon combustion were 4.8%. The life time of the impregnating system was 180 days.

EXAMPLE 8

Birch wood specimens were loaded into an autoclave which was then evacuated to a residual pressure of 0.0067 MPa during a period of 1 hour. This done, a 35% aqueous solution of phenolic alcohols was fed into the autoclave, and the pressure was built up to 0.8 MPa. On the expiration of 4 hours, the pressure was lowered, the phenolic alcohol solution pumped out, and, immediately after, an aqueous solution of salts containing 20% of diammonium phosphate and 20% of ammonium sulphate and preheated to 103° C. was fed into the same autoclave and kept constantly in circulation by means of a rotary pump. The specimens were treated with said solution for a period of 10 hours, at atmospheric pressure, with the processes of impregnating the wood specimens with salts, drying the impregnated wood, and curing the impregnating system contained therein occurring simultaneously. Then the aqueous salt solution was pumped out, and a drying vacuum was created for 20 minutes. The finished hard-burning modified wood specimens were unloaded. The process time was 16 hours. The modified wood was found to contain 27% of polymer. The mass losses upon combustion were 4.1%. The life time of the impregnating system was 150 days.

EXAMPLE 9

Birch wood specimens were loaded into an autoclave which was then evacuated to a residual pressure of 0.0067 MPa during a period of 1 hour. This done, a 35% aqueous solution of phenolic alcohols was fed into the autoclave, and the pressure was built up to 0.8 MPa. On the expiration of 4 hours, the pressure was lowered, the phenolic alcohol solution pumped out, and, immediately after, an aqueous solution of salts containing 15% of diammonium phosphate and 15% of ammonium sulphate and preheated to 103° C. was fed into the same autoclave and kept constantly in circulation by means of a rotary pump. The specimens were treated with said solution for a period of 10 hours, at atmospheric pressure, with the processes of impregnating the wood specimens with salts, drying the impregnated wood, and curing the impregnating system contained therein occurring simultaneously. Then the aqueous salt solution was pumped out, and a drying vacuum was created for 20 minutes. The finished hard-burning modified wood specimens were unloaded. The process time was 16 hours. The modified wood was found to contain 25% of polymer. The mass losses upon combustion were 4.7%. The life time of the impregnating system was 150 days.

In describing the above examples of various embodiments of the present invention, a limited specific terminology has been used for greater clarity. It will be understood, however, that the present invention is by no means restricted by the terminology adopted herein, and that each of the terms used covers all equivalent elements such as may serve the same functions and be used to solve the same problems.

Although the present invention has been described herein with reference to the preferred typical embodiments thereof, it will be apparent to those skilled in the art that there may be minor modifications made in the procedures comprised in the proposed method of preparing modified wood.

All such modifications and variations are contemplated to be embraced in the spirit and scope of the invention, as defined in the appended claims.

We claim:

1. A method of preparing modified wood, comprising the successive steps of impregnating a wood in two stages, at the first stage the wood being impregnated by phenolic alcohols, while at the second stage the wood is impregnated by fire retardants, drying it and heat treating to obtain the end product.

2. A method according to claim 1, wherein the second stage of impregnation is combined with drying and heat treatment.

3. A method according to claim 2, wherein aqueous solutions of phenolic alcohols concentrated to 25–50% by mass and fire retardants concentrated to 20–40% by mass are used for impregnation.

4. A method according to claim 2, wherein the combined process of impregnation, drying, and heat treatment is performed in a hydrophilic heat transfer fluid.

5. A method according to claim 4, wherein the hydrophilic heat transfer fluid used is an aqueous solution of a mixture of ammonium salts, having a boiling temperature of at least 100° C.

* * * * *